July 22, 1958
R. ZELINSKY
2,844,315
STOCK EXHAUSTION WARNING AND COUNTER FOR
AUTOMATIC SCREW MACHINES
Filed Feb. 7, 1955
3 Sheets-Sheet 1
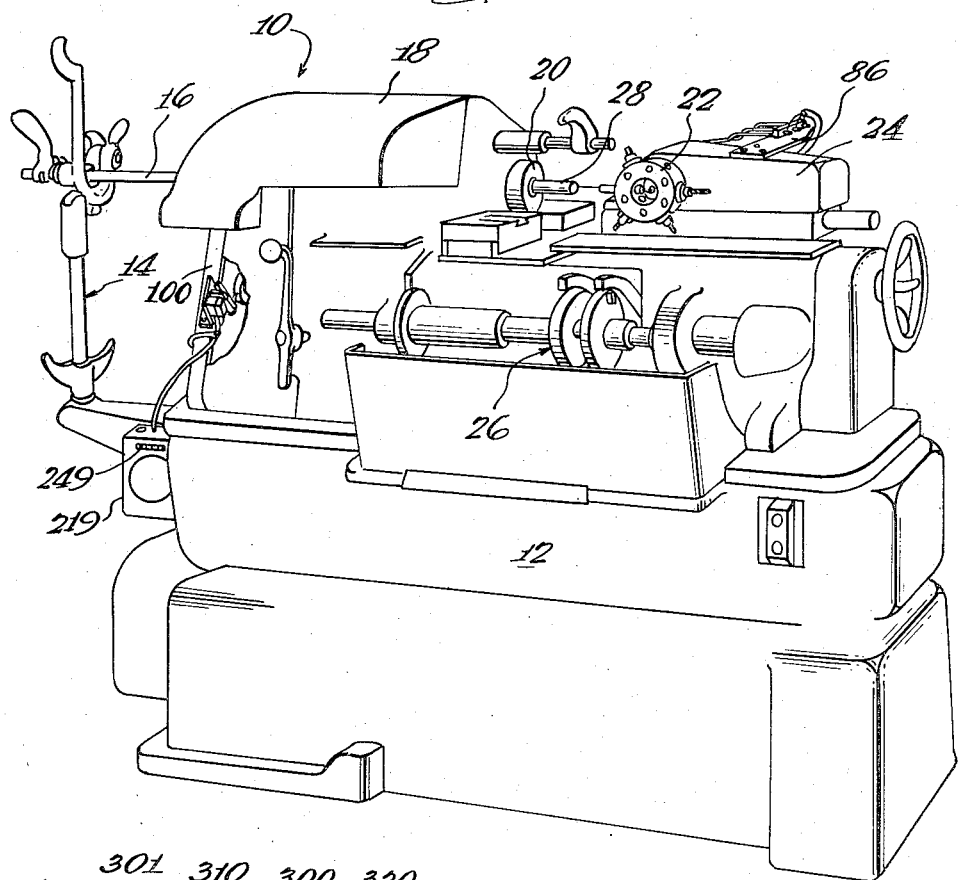
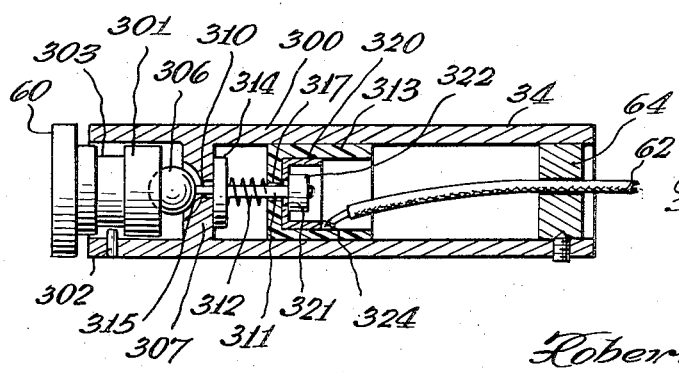
Inventor
Robert Zelinsky
By Silverman & Mullin
Attorneys July 22, 1958
R. ZELINSKY
2,844,315
STOCK EXHAUSTION WARNING AND COUNTER FOR
AUTOMATIC SCREW MACHINES
Filed Feb. 7, 1955
3 Sheets-Sheet 3
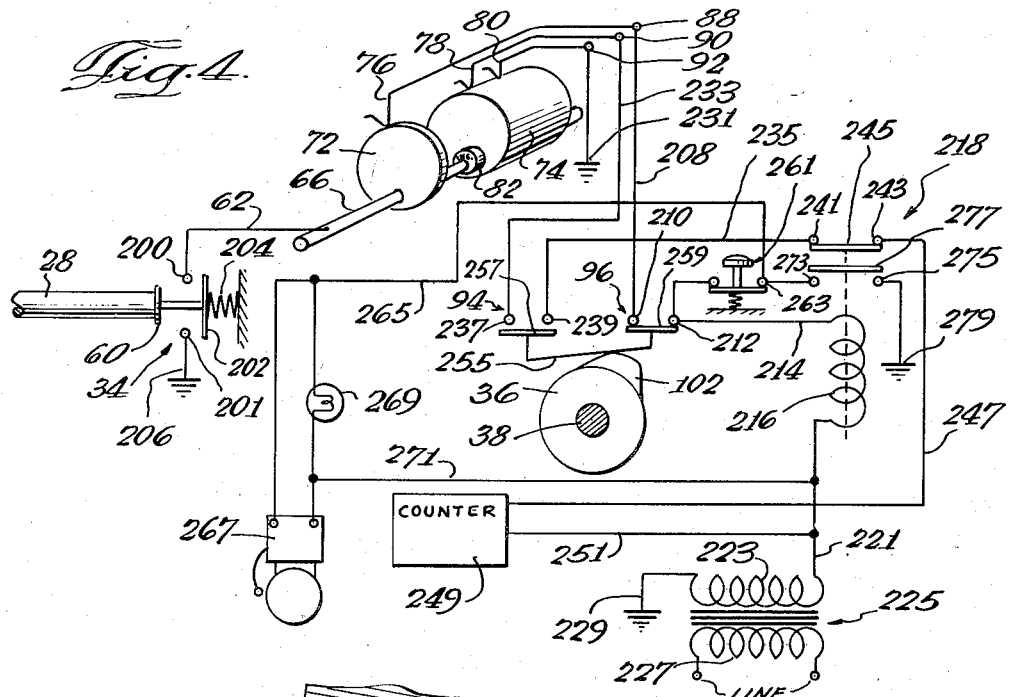
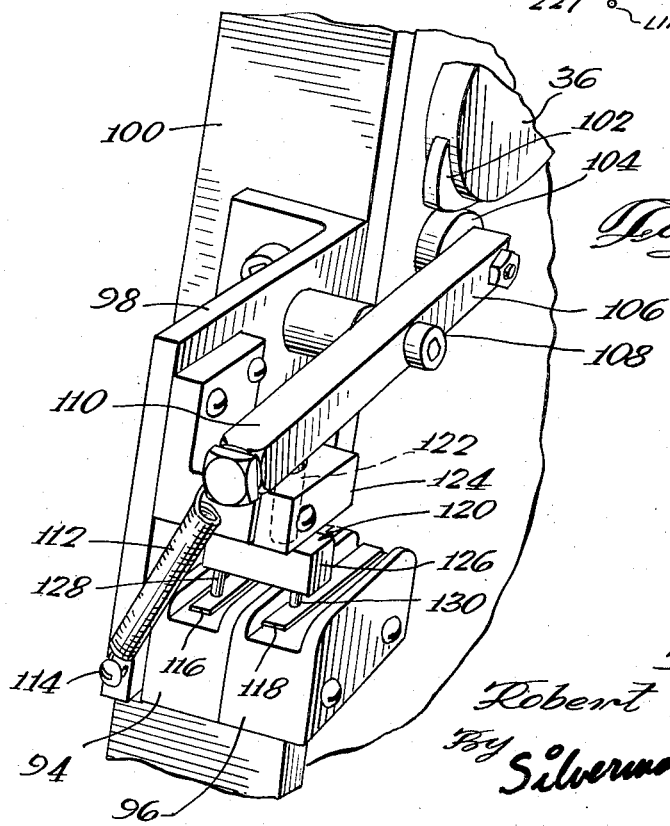
Inventor
Robert Zelinsky
By Silverman + Mullin
Attorneys United States Patent Office 2,844,315
Patented July 22, 1958

2,844,315

STOCK EXHAUSTION WARNING AND COUNTER FOR AUTOMATIC SCREW MACHINES

Robert Zelinsky, Chicago, Ill.

Application February 7, 1955, Serial No. 486,391

15 Claims. (Cl. 235—92)

This invention relates generally to an automatic counter and alarm mechanism for automatic screw machines and more particularly is concerned with apparatus combined with an automatic screw machine which will count the number of full pieces being made and will give a warning audible and/or visual when the stock has been depleted, after which the counting mechanism is rendered inoperative.

Although the invention herein is described in this specification as associated with and installed upon an automatic screw machine of the current design manufactured and sold by the Brown & Sharpe Mfg. Co. of Providence, Rhode Island, the invention is not limited in any manner to a particular automatic screw machine but is feasible for use with many in use today.

In addition to the advantages of repetitive and dependable precision in automatic screw machines (advantages also possessed by manual turret lathes) there is the advantage of unattended operation. The automatic screw machine provides for feeding of stock through a hollow spindle; chucking by automatic feed mechanisms in an automatic collet; automatic turret operation and indexing; and automatic re-cycling. Thus, except for jams, once set up, the machine need not be attended.

Where sheet stock can be fed into automatic punch presses from long strips on rolls the problem of counting is relatively simple since the device may easily be actuated by the strokes of the punch press or movement of the strip. The total number of pieces per roll is so much greater than the one or two miscounts at the beginning or end of a roll, or during jams, as to make such miscounts negligible. Any simple mechanism which will throw a switch to stop the press where stock is depleted may be used in conjunction with the apparatus.

Automatic screw machines, however, use bar or rod stock. The lengths are relatively short and a substantial portion is totally within the machine before depletion. The operations performed on the stock usually take place so close to the collet as to prevent the insertion of apparatus which might operate thereat. Furthermore frequent starting and stopping of the machine is uneconomical and annoying. Usually in shops where one man is required to attend several automatic screw machines, he estimates the length of time for the stock to be depleted, while attending other duties, and comes back to each machine from time to time to ascertain the status of the stock feed. Since a substantial piece of stock is always hidden in the spindle, the last piece may be turned a moment after the attendant has checked the device.

With the stock depleted, the automatic screw machine continues to go through its cycle, making substantially the same noises, but producing nothing. Obviously this is wasteful of production time, both of the machine, and employee. Further time is lost in counting the pieces resulting from the operation of the machine, and it is certain that the number of cycles executed by the machine is not a measure of the number of pieces produced.

It is therefore an important object of the invention to provide apparatus to eliminate the disadvantages described above and thereby to increase production and efficiency of both machine and employees.

A further object of the invention is to provide novel apparatus which operates in conjunction with the normal stop member of the turret such that the failure of the collet to eject a length of stock sufficient to be supported for operation (as would occur at the end of the stock length) would result in a signal being energized, and will not result in a counting impulse.

In connection with the object immediately mentioned above, the turret is also the source of an impulse which causes a proper count in the event a length of stock is moved against said stop member, which thereby serves a multiple function.

Still a further object of the invention is to provide apparatus in which the electrical circuits for energizing either the counter or the signal are closed only for a short time having a predetermined relationship with the operation of the automatic feed mechanism, so that no current flows through the circuits except at a fraction of the operating cycle of the screw machine.

Still a further object of the invention is the provision of apparatus in which the electrical circuits for the counter and signal are rendered mutually exclusive and in which the means for so rendering the circuits is normally arranged to cause the counter to operate with each revolution of the turret, but only if a work piece is fed to proper working position.

Another object of the invention is to provide a pair of mutually exclusive circuits, one controlling a signal and the other operating a counter, and there being means for rendering the normal operation of the apparatus counter circuit energizing, said means serving to open the counter circuit and close the signal control circuit when a work piece is not properly fed.

An important object of the invention is to provide in apparatus of the character described means operating off the automatic feed mechanism of the automatic screw machine which closes switches in both the counter and signal control circuits, and thereby serves as an enabling mechanism; and another object is to provide means for delaying the closing of the counter circuit switch after the signal control circuit switch so that in the event the remaining part of the signal control circuit is also closed, the closing of the counter switch will have no effect upon the counter circuit.

An object of the invention is to provide a mulitple pole relay having one set of contacts normally closed and in the counter circuit, but having another set of contacts normally open and in a signal energizing circuit, so that in the event the signal control circuit is energized it will automatically open the counting circuit.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of an automatic screw machine having the invention associated therewith.

Fig. 3 is a perspective view of the switches mounted on the end of the automatic screw machine in engagement with a cam operating off the automatic feed mechanism of the automatic screw machine.

Fig. 4 is a diagrammatic representation of the electrical circuit of the invention.

Fig. 5 is a median sectional view through a stop member for a turret which has been modified in accordance with the invention.

Figure 2:
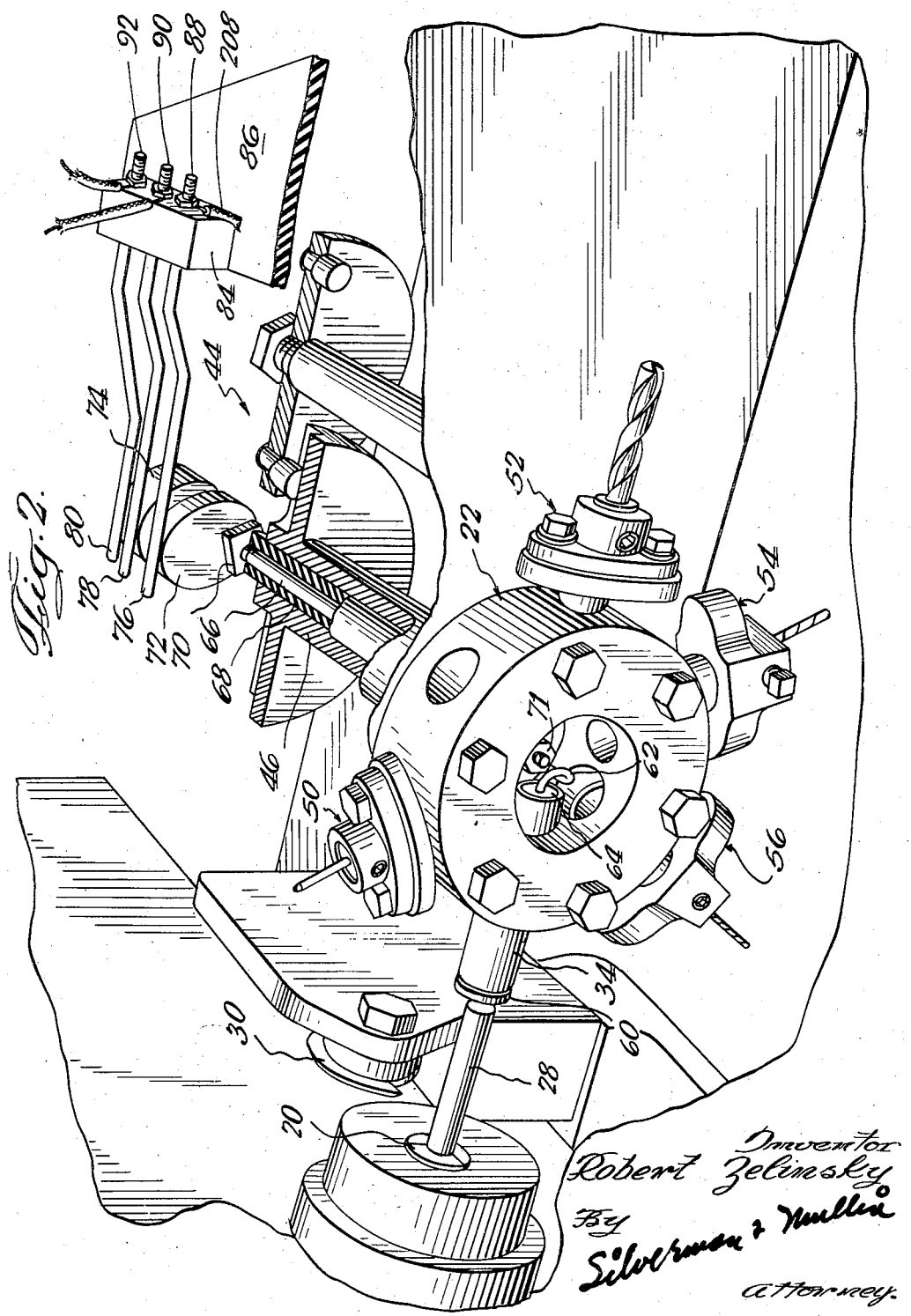
Fig. 2 is an enlarged perspective view with portions broken away and showing the turret of the automatic screw machine with portions of the apparatus of the invention mounted thereon.

Generally the invention comprises several parts which are associated with the screw machine in such a manner at to give rise to the benefits of the invention. The signal and counting mechanisms are of conventional construction, the important function being the energization of these devices at a proper time in the cycle of the machine. The turret of the machine carries a stop member in one hole which has a normally closed switch associated therewith and in the signal control circuit. The turret spindle carries two cams, one of which is in the signal control circuit and the other of which grounds the counter circuit. A relay is provided which, when not energized connects the counter circuit to a source of electrical power, while keeping the signal energizing circuit open. The counter circuit and signal control each have an additional switch both of which are closed by the rotation of the feed mechanism shaft of the machine, but the signal control circuit switch being closed first.

Thus, when the turret brings the stop member into position the cams are arranged to close their respective circuits. The automatic feed mechanism then feeds a piece against the stop member and thereafter closes both of its associated switches. If a piece actually engages the stop member it opens the switch in the signal control circuit, prevents the relay solenoid from being energized and therefore enables the switch operated by the automatic feed mechanism to complete the closing of the counter circuit, energizing the same and the counter. If a piece does not engage the stop member, its switch remains closed, so that the closing of the switch operated by the automatic feed mechanism closes the signal control circuit, energizing the solenoid of the relay, operating the relay to open the counter circuit and close the signal circuit. A holding connection keeps the signal circuit energized until manually disconnected.

Referring now to the drawings the automatic screw machine is designated generally by the reference character 10 in Fig. 1. Only the general outline is shown for clarity, and it will be seen that there is a supporting body or base 12 having the machining portion on the right hand side and the feed portion on the left hand side. The stock supporting means is shown at 14, a rod or bar of stock is shown at 16, the hollow spindle is indicated at 18, the collet at 20, the turret at 22, and the turret drive housing at 24. Suitable indexing means is indicated generally at 26. Note that there is an end 28 of the stock bar or rod protruding from the collet 20 ready to be machined. None of the cut-off tools or shaping members which operate on the sides of the workpiece, as the end 28 will be termed, are shown to give a clear view in Fig. 1. In Fig. 2, however, one such tool is shown positioned at 30.

Under normal conditions, and with the conventional screw machine, the cycle is well known. The indexing mechanism 26 operates suitable feed mechanism, which drives the stock bar 16 forward out of the end of the collet 20 against a stop member 34 carried by the turret 22 so that the proper amount protrudes in the working area. The feed mechanism is not shown, but it is essential to the invention that there be a shaft which rotates at least once at the time of feeding. This is an element of all automatic screw machines that I am acquainted with, and this shaft is located at the left hand end of the machine as viewed in Fig. 1. I secure a rotative member 36 to the end of said feed mechanism shaft which is designated 38 in Fig. 4 and there is a cam 102 on the shaft which therefore makes one complete revolution each time the shaft 38 rotates. This, of course occurs once for each cycle of the screw machine. Reference made hereinafter to the expression "cyclic kinematic element" refers to a machine element whose movement passes through a predetermined repetitive cycle, and in the particular structure shown, the cyclic kinematic element is the shaft 38 which rotates once for each feed cycle.

Continuing with an explanation of the operation of the conventional machine, after the workpiece 28 is in position, the various tools operate on the workpiece. The turret is driven to each of its positions by suitable mechanism housed in the housing 24, some of which is shown in Fig. 2 at 44. The turret rotates on a shaft 46 which carries cams for a purpose presently to be described. The turret is of conventional construction and as shown in Fig. 2, besides the stop member 34, several tool holders are mounted in the usual holes in the turret and carry various tools for operating on the workpiece 28. Such tool holders and tools are designated 50, 52, 54 and 56 in Fig. 2.

Each of the tools is presented to the workpiece one after the other as controlled by the indexing mechanism and feeds operated thereby, all in a manner well-known. When the cycle has been completed, the workpiece 28 drops into a suitable bin (not illustrated) after having been cut from the bar or rod of stock 16 at the collet 20. Obviously the turret shaft 46 rotates one revolution for each cycle.

As explained, there is no relationship between the drive for the machine and the amount of stock in the ordinary screw machine. Consequently, the machine continues to operate although the stock is depleted, and will continue to re-cycle itself even when there is no stock.

Considering first Fig. 2, it will be seen that the stop member 34 is secured within an opening in the turret 22 and extends approximately to the center thereof. The stop member has a movable button end 60 which, when pressed inwardly by the end of the workpiece 28 will open a normally-closed switch in the stop member. One of the switch terminals is connected to the body of the stop member 34, and hence is grounded to the machine. The other extends out of the inner end of the stop member as shown at 62 through an insulating plug 64 and is electrically connected to an elongate conductor 66 which is secured on the interior of the turret shaft 46 and is insulated therefrom by the elongate insulating bushing 68. For example the ends of the conductor 66 may be threaded and receive nuts 70 and 71 securing the conductor 66 in the bushing 68. At its outer end the conductor 66, which is preferably in the form of a rigid shaft-like member, there are secured two cams 72 and 74. These may be eccentrically mounted metal discs, arranged with their greatest radial dimension upward when the stop member 34 is in the position shown in Fig. 2 to be engaged by the brushes or wipers 76, 78 and 80.

As indicated in the diagram of Fig. 4, the cam 72 electrically connects with the conductor 66 but the cam 74 does not, and for this purpose is mounted upon an insulating bushing 82. The wipers or brushes 76, 78 and 80 are mounted in an insulating block 84 which in turn is secured to a bracket 86 carried by the housing 24.

It will be hereinafter explained how the connections are made from the brushes, but for the time being suffice it to say that of the three electrical connections presented as at 88, 90 and 92 one is grounded and the other two extend to the switches which are operated by the feed mechanism shaft. The two "live" leads connect with the switches illustrated in Fig. 3.

The switches 94 and 96 are carried by a bracket 98 which is mounted upon the frame 100 of the screw machine at the left hand end thereof (as viewed in Fig. 1). The rotative member 36 carries a cam 102 which engages a roller 104 carried on one end of an arm 106 pivoted to the bracket 98 at 108. The front end 110 of the arm 106 is pulled downwardly normally, as viewed in Fig. 3, by a spring 112 secured between the end 110 and a screw 114 carried on the bracket 98. The switches 94 and 96 are of the variety which operate through very small movement of an external member. These are called "microswitches." For example, the operation of the switches illustrated is caused by vertical movement of the resilient leaves 116 and 118 on the external upper face of the switches. The particular arrangement shown requires the switches normally to be open when the front end 110 of the arm 106 is down. In other words, when the leaves are permitted to move upward, the switches are closed.

The arm 106 carries an inverted T-shaped member 120 on the bottom thereof, comprising a vertical member 122 which reciprocates within a split guide bracket 124 mounted on the bracket 98, and a horizontal cross member 126 which carries pusher pins 128 and 130 adapted to engage the leaves 116 and 118 respectively. Note that the pin 130 is shorter than the other so that when the T-shaped member 120 is moved upward, the switch 96 will be closed first. The leaf 116 has slightly longer to travel before permitting the switch 94 to close. Obviously the T-shaped member will move upward against the tension of spring 112 when the cam 102 engages and presses down on the roller 104. This occurs while the feeding movement takes place. Although not shown by way of structure, the feeding action requires only a portion of the rotative movement of the shaft 38, and the cam 102 is so positioned that the roller 104 is engaged after the workpiece 28 has been pushed out of the collet 20 against the stop member 34. Since the switches 94 and 96 are enabling switches, serving to energize circuits, the conditions which control that which occurs are already set up when these switches are closed.

Looking now at the circuit diagram of Fig. 4, the operation of the apparatus will be explained. The switch 34 is normally closed, that is the contacts 200 and 201 are bridged by the contact portion 202. The button 60 is normally pushed to the left by the spring 204 until the workpiece 28 pushes the same to the right and opens the circuit from the lead 62 to ground 206. When the stop member 34 is poised to receive the leading end of the workpiece 28 the cams 72 and 74 are in engagement with the brushes 76, 78 and 80. The signal control circuit extends from the conductor 66 through cam 72, brush 76, terminal 88, lead 208 to contact 210 of switch 96. The other contact of switch 96 is 212 and same is connected by lead 214 to the solenoid 216 of the relay 218 which is located in a housing 219 secured to the base 12 at some convenient location. The opposite pole of the relay solenoid 216 is connected by lead 221 to the low voltage secondary 223 of a transformer 225 the primary 227 of which is connected across a high voltage A. C. line. The end of the secondary 223 opposite the lead 221 is grounded at 229.

The counter circuit is closed by the cam 74 which connects terminal 90 to ground 231 through brushes 78 and 80, lead 233, switch 94, lead 235 to the relay 218. The switch 94 has contacts 237 and 239 adapted to be bridged by operation of the switch. The contacts 241 and 243 are normally bridged by conductor 245 thereby completing the circuit through the lead 247 through the counter 249 to lead 251, lead 221, secondary 223 and ground 229.

When there is a workpiece which has opened the switch 34, at the time of rotation of the shaft 38, bringing the cam 102 into engagement with the roller 104, the effect is the same as though the cam 102 in the diagram pushed the connecting member 255 upward to cause the contacts of the respective switches 94 and 96 to be bridged by the conductors 257 and 259. The diagram has been executed in such a manner that it will appear that the switch 96 will be closed first, which is actually what occurs as has been previously explained. Since the switch 34 is open, nothing occurs in the signal control circuit and the solenoid 216 is not energized. Therefore closing of the switch 94 causes completion of the counter circuit and an impulse from secondary 223 energizes the counter device 249.

The counter 249 is also housed in the housing 219 and may be of the solenoid energized type, such as for example manufactured by the Veeder-Root Company of Hartford, Connecticut. The numeral window of the counter can be seen in Fig. 1.

Thus, the workpiece engaging against the stop member 34 will cause the counter to advance one digit.

It is noted that there is a holding circuit and a signal energizing circuit, one of which is in parallel with the relay and the other of which is in series with the relay, and that there is a push-button switch 261 between the solenoid 214 and said two circuits. The signal energizing circuit extends from the terminal 212 through the normally closed push-button switch 261 (which is located at the housing 219 with its button protruding to enable manual operation thereof) and from the terminal 263 of the switch by way of lead 265 to either an audible signal device 267 or a warning lamp 269, or both if desired. From the signal devices, the circuit extends by way of lead 271 back to the lead 221. The holding circuit extends through the normally open contacts 273 and 275 and bridging conductor 277 of the relay 218 to ground at 279. Obviously neither the holding circuit nor the signal operating circuit are energized unless the signal control circuit is completed through the switch 34 to ground.

Suppose that there is no workpiece 28, the end of the stock member having been reached. When the turret shaft turns the cams 72 and 74 to the position of Figs. 4 or 2, the switch 34 remains closed. Thereafter, since the switch 96 is closed before switch 94, and its contacts 210 and 212 bridged, the solenoid 216 will be energized before the closing of switch 94 completes the counter circuit. The energization of the solenoid 216 moves the bridging conductors 245 and 277 downward as viewed in Fig. 4 thereby opening the counter circuit and closing the holding circuit. Thereafter the holding circuit will energize the solenoid 216 so that when the cam 102 passes the roller 104 and opens switches 94 and 96, the solenoid will still be energized. At the same time that the solenoid is energized, the signal energizing circuit is connected across the solenoid and is also energized.

This condition will be maintained, with the signal 267 sounding and the light 269 ignited until the button of switch 261 is depressed, momentarily opening the connection to lead 214. This is done by the workman called to the machine by the signal that the stock is depleted. The signal device 267 and signal light 269 may both be at the housing 219. This opening of the switch 261 de-energizes the solenoid 216 breaking the holding circuit and opening the signal circuit while closing the counter circuit. If no stock is inserted thereafter, and the automatic screw machine is permitted to continue re-cycling, when the turret again reaches the position shown in Fig. 2, the signal circuit will again be energized. It is therefore necessary to stop the machine or insert another rod or bar 16 of stock to enable the screw machine to continue, counting instead of operating the signal means.

The stop member 34 may be constructed in any suitable manner to perform the function of stopping the forward movement of the workpiece 28 and opening a normally closed switch. The simplest structure for this is diagrammed in Fig. 4, but a desirable construction is illustrated in Fig. 5.

The stop member 34 has a barrel body 300 which is cylindrical and hollow and has a button 60 protruding from one end. The button is formed on the end of a piston 301 reciprocating in the end of the barrel 300 and the movement of piston 301 is limited by a pin 302 engaging in an annular groove 303. A ball 306 is located between the end of the piston 301 and a wall 307 on the interior of the barrel, there being suitable seats for the ball. This provides a thrust support for the inner movement of the piston 301. The ball 306 and piston 301 are normally pushed outward by a pin 310 on the end of an axially movable member 311 being thus urged by a coiled spring 312 located between a bushing 313 and stop member 314 carried by member 311.

A central opening 315 permits passage of the pin 310, and the member 311 extends into the interior of the bushing 313 through a central opening 317. The bushing is cup-shaped and made of insulating material, and has a metal contact ring 320 therein having a central opening 321 larger than opening 317. A metal end washer 322 is arranged to contact the ring 320 except when pushed to the right as for example by the button being moved inward. Lead 62 is soldered to the contact ring 320 at 324, forming one side of the switch defined in the diagram of Fig. 4 as 34. The other side is grounded through the barrel wall, all of the parts described being metal except for the bushing 313.

It is pointed out that for a set-up as described herein, where there is a single operation of the feed mechanism for a given workpiece, the feed mechanism not being required to operate until another workpiece is reached, the cam 74 and its associated brushes 78 and 80 may be eliminated. The contacts 90 and 92 may be connected together. The counter circuit cannot be energized except by the enabling switch 94 which operates only once for each completed workpiece. It often occurs however that the feed mechanism may be required to operate several times for each workpiece. In this case, one or more stop members in addition to stop member 34 may be secured to the turret so that it is not desired to count each time the feed mechanism operates. In this case, the cam 74 closes the counting circuit only at the beginning of the cycle, and hence is required. Its presence otherwise is not deleterious.

The simplicity of the device and the positive operation thereof should be apparent without further discussion, as should be the advantages gained through the invention.

What it is desired to claim is:

1. In a conventional automatic screw machine employing a stock feed mechanism to intermittently advance stock toward a revolving tool turret to be machined and the turret carries a stop member which it rotates to a position intercepting the path of movement of the stock prior to the start of a machining cycle: the herein invention which comprises a stock counting and exhaustion warning system capable of operation correlated with the cyclic operation of the screw machine, said system comprising, a multi-branched electrical circuit having a source of power and a signal device connected to be selectively energized from said source at a predetermined portion of the operating cycle of the machine, a first branch including a switch connected between said source and device urged to a normally closed condition and capable of being opened by the stop member when said member is engaged by stock, a second branch including first switch means and cam means driven to close the switch means after the turret has revolved the stop member to said position and before advance of the stock by said feed mechanism, a third branch including second switch means and enabling means driven to close the second switch means after the first switch means are closed to energize the entire circuit, the signal device being automatically operated when the stock fails to engage said stop member to open said normally closed switch prior to commencement of the machining cycle and prevented from operating when stock engages said stop member to open said normally closed switch.

2. Apparatus as claimed in claim 1 in which there is an electrically energized counter device, a second circuit adapted to connect said source of energy to said counter device, said enabling means is adapted to close a first part of said second circuit but only after closing said third branch of said first circuit, said circuits both connected to a switching device rendering said second circuit normally closed and said first circuit normally open, a solenoid for reversing the connections of the switching device and energized through said first circuit whereby to render operation of said counter device and signal device mutually exclusive.

3. Apparatus as claimed in claim 1 in which there is an electrically energized counter device, a second circuit adapted to connect said source of energy to said counter device, said enabling means is adapted to close a first part of said second circuit but only after closing said third branch of said first circuit, said circuits both connected to a switching device rendering said second circuit normally closed and said first circuit normally open, a solenoid for reversing the connections of the switching device and energized through said first circuit whereby to render operation of said counter device and signal device mutually exclusive, a holding circuit for keeping the first circuit energized notwithstanding momentary operation of said enabling means, and manual disconnect means in said holding circuit.

4. In a conventional automatic screw machine employing an automatic feed mechanism having a revolving shaft element and automatic collet means for intermittently advancing stock to a revolving tool turret to be machined: a stock exhaustion and counter apparatus comprising, electrically operated signal and counter devices, a source of energy, a circuit for each device connecting same to said source, a magnetic switching device connected to the source through said signal circuit and urged normally to hold the counter circuit closed, a linearly movable stop device capable of being mounted on the turret for rotation therewith to a position intercepting the path of movement of the stock and a normally closed switch in the signal circuit capable of being opened by the stop member when same is moved, a normally open enabling switch in each circuit and cam means driven to close said enabling switches when the stock is initially advanced, said apparatus arranged for sequential operation of the elements thereof correlated to the cyclic operations of the machine whereby the normally closed switch is rendered open by the engagement of stock with the stop member to move the same and the cam means thereafter will close the enabling switches to energize the counter device only.

5. Apparatus as described in claim 4 in which said normally closed switch is connected to energize both the signal and counter circuits in its closed condition whereby closing of the enabling switches will operate the signal device and cause the magnetic switch device to open the counter circuit.

6. Apparatus as described in claim 5 in which said signal circuit includes a normally open switch arranged to be actuated by the turret to a closed condition when the stop member is moved to said position.

7. Apparatus as described in claim 5 in which said signal and counter circuits each have a normally open switch arranged to be actuated to a closed condition by the turret when the stop member has reached said position.

8. Apparatus as described in claim 4 in which said normally closed switch is connected to energize both the signal circuit and magnetic switch from said source when stock fails to engage against said stop member, said magnetic switch thereby being opened upon energization, a holding circuit providing a by-passed path for said magnetic switch to said source independent of the signal circuit, but connecting the signal device to said source, and circuit completing means operable by the magnetic switch to energize the holding circuit upon closing of the enabling switches to keep the signal device independently energized until the holding circuit is opened, said holding circuit including a manually operable device for disconnecting both the signal and holding circuit from said source.

9. Apparatus as described in claim 8 in which the holding circuit has a manual circuit opening device for disconnecting both the signal and holding circuit from said source of energy.

10. A stock exhaustion warning and counter apparatus for automatic screw machines of the type which have a revolving tool turret, an automatic stock feed mechanism including a cyclic kinematic element and automatic collet means, said turret having a stop member presented to an end of a stock member ejected from said collet means by said feed mechanism at the start of a machining cycle, said turret making a full revolution during said cycle, and said kinematic element moving through its full feed cycle at the start of the machining cycle after said stop member is in said presented position, said stock end comprising a workpiece of predetermined length providing the total length of the stock member is greater than the distance from collet means to stop member, said apparatus capable of sequential operation correlated with the cyclic operation of the machine and comprising an electrically operated signal device, an electrically operated counter device, normally closed switch means operable by said stop member and adapted to be opened only when engaged by a workpiece, two normally open switches operable by said kinematic element and adapted to be closed during the feeding cycle of the automatic stock feed mechanism, a first circuit including a source of electrical energy connected to the signal device and having said stop member switch and one of said kinematic element operated switches therein, another normally open switch capable of being operated by said turret to be closed but only when said stop member is in said presented position and being in series with said first circuit, a second circuit also connected with the source of energy and with said counter device and having the second of said kinematic element operated switches in series therewith, said second circuit having a pair of normally closed contacts in series therewith, a magnetic device connected to be energized through the first circuit and when so energized opening the second circuit, and the two normally open kinematic element operated switches being arranged such that the said one of such switches closes before the other to de-energize the counter circuit if the workpiece does not engage the stop member simultaneously with energizing the signal device.

11. Apparatus as described in claim 10 in which there is a second normally open switch capable of being operated by said turret but in series with said second circuit and adapted to be closed only when said stop member is in presented position.

12. Apparatus as described in claim 11 in which said apparatus includes a rotatable shaft capable of installation to be driven by the turret and there are two cams mounted on the shaft to rotate therewith insulated from one another, brush means engaging the cams, one cam and its brush means forming the first mentioned turret operated switch, and the other cam and its brush means forming the second mentioned turret operated switch, the brush means making engagement with the cams only at a predetermined position of the said turret.

13. Apparatus as described in claim 11 in which said apparatus includes a rotatable shaft capable of installation to be driven by the turret and there are two cams mounted on the shaft to rotate therewith insulated from one another, brush means engaging the cams, one cam and its brush means forming the first mentioned turret operated switch, and the other cam and its brush means forming the second mentioned turret operated switch, the brush means making engagement with the cams only at a predetermined position of the said turret, said shaft having a conductor connected with said stop member switch at one end and said one cam at the other end.

14. In a conventional automatic screw machine employing a stock feed mechanism to intermittently advance stock toward a revolving tool turret to be machined and the turret carries a stop member which it rotates to a position intercepting the path of movement of the stock prior to the start of a machining cycle: the herein invention which comprises an electrically operative stock control system capable of operation correlated with the cyclic operation of the screw machine, said system comprising, a multi-branched electrical circuit having a source of power and a signal device connected to be selectively energized from said source at a predetermined portion of the operating cycle of the machine, a first branch including a switch connected between said source and device urged to a normally closed condition and capable of being opened by the stop member when said member is engaged by stock, a second branch including first switch means and cam means driven to close the switch means after the turret has revolved the stop member to said position and before advance of the stock by said feed mechanism, a third branch including second switch means and enabling means driven to close the second switch means after the first switch means are closed to energize the entire circuit, the signal device being automatically operated when the stock fails to engage said stop member to open said normally closed switch prior to commencement of the machining cycle and prevented from operating when stock engages said stop member to open said normally closed switch.

15. In a conventional automatic screw machine employing an automatic feed mechanism having a revolving shaft element and automatic collet means for intermittently advancing stock to a revolving tool turret to be machined: an electrically operated stock control system comprising, an electrically operated signal device, an electrically operated stock control device, a source of energy, a circuit for each device connecting same to said source, a magnetic switching device connected to the source through said signal circuit and urged normally to hold the control circuit closed, a linearly movable stop device capable of being mounted on the turret for rotation therewith to a position intercepting the path of movement of the stock and a normally closed switch in the signal circuit capable of being opened by the stop device when same is moved, a normally open enabling switch in each circuit and cam means driven to close said enabling switches when the stock is initially advanced, said system arranged for sequential operation of the components thereof correlated to the cyclic operations of the machine whereby the normal closed switch is rendered open by the engagement of stock with the stop device to move the same and the cam means thereafter will close the enabling switches to energize the stock control device only.

References Cited in the file of this patent

UNITED STATES PATENTS

| | | |
|---|---|---|
| 2,425,124 | Ray | Aug. 5, 1947 |
| 2,615,081 | Hoff | Oct. 21, 1952 |